United States Patent [19]
Glendening

[11] 3,906,810
[45] Sept. 23, 1975

[54] ENDLESS BELT TYPE MOTION TRANSMITTING DEVICE HAVING A VARIABLE SPEED OUTPUT FOR A CONSTANT SPEED INPUT

[75] Inventor: Major D. Glendening, Benton Harbor, Mich.

[73] Assignee: F. P. Rosback Co., Benton Harbor, Mich.

[22] Filed: Mar. 4, 1974

[21] Appl. No.: 447,980

[52] U.S. Cl. .................... 74/395; 74/217 C
[51] Int. Cl.² .................... F16H 35/06; F16H 9/00
[58] Field of Search ...... 74/217 S, 217 C, 393, 397, 74/395, 217 R, 216.5

[56] References Cited
UNITED STATES PATENTS

| | | | |
|---|---|---|---|
| 2,106,918 | 2/1938 | Perazzoli | 74/397 X |
| 3,166,947 | 1/1965 | Hendershot | 74/395 X |
| 3,393,754 | 7/1968 | Hachemeister | 74/216.5 X |

*Primary Examiner*—Leonard H. Gerin
*Attorney, Agent, or Firm*—Oltsch & Knoblock

[57] ABSTRACT

A motion transmitting device of the endless belt type in which an idler member in power transmitting engagement with the belt and upon shiftable movement causes the output of the device to vary as to speed, and direction if desired, for a constant one-directional speed input.

6 Claims, 5 Drawing Figures

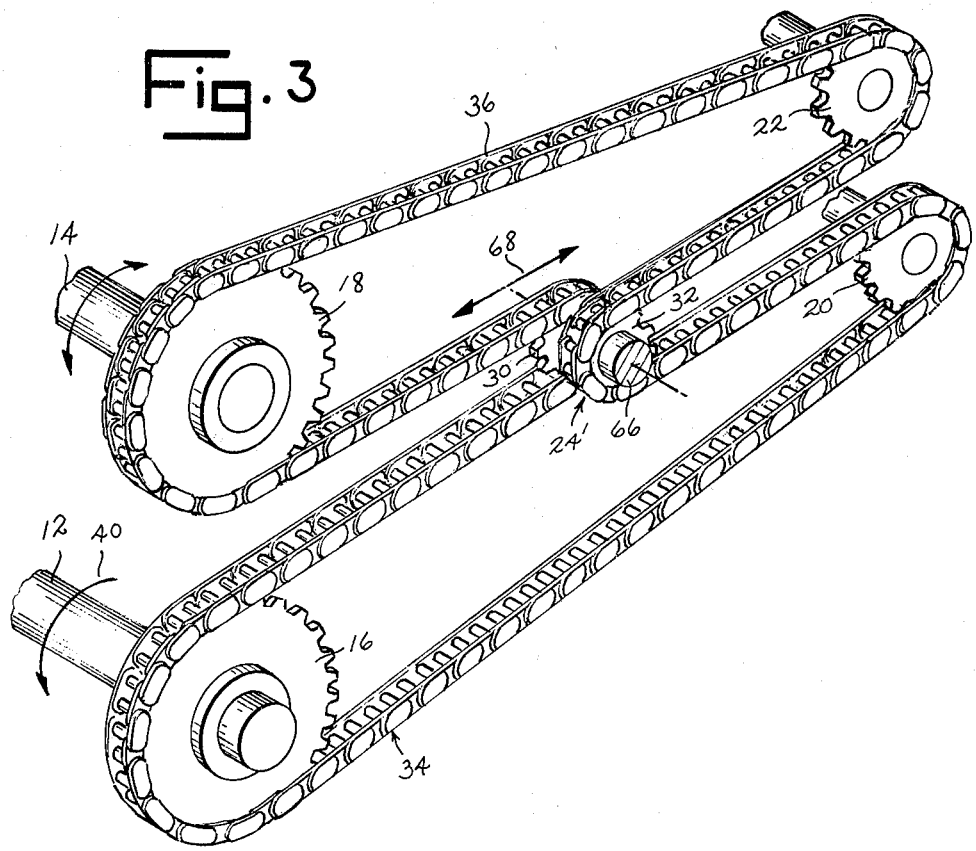
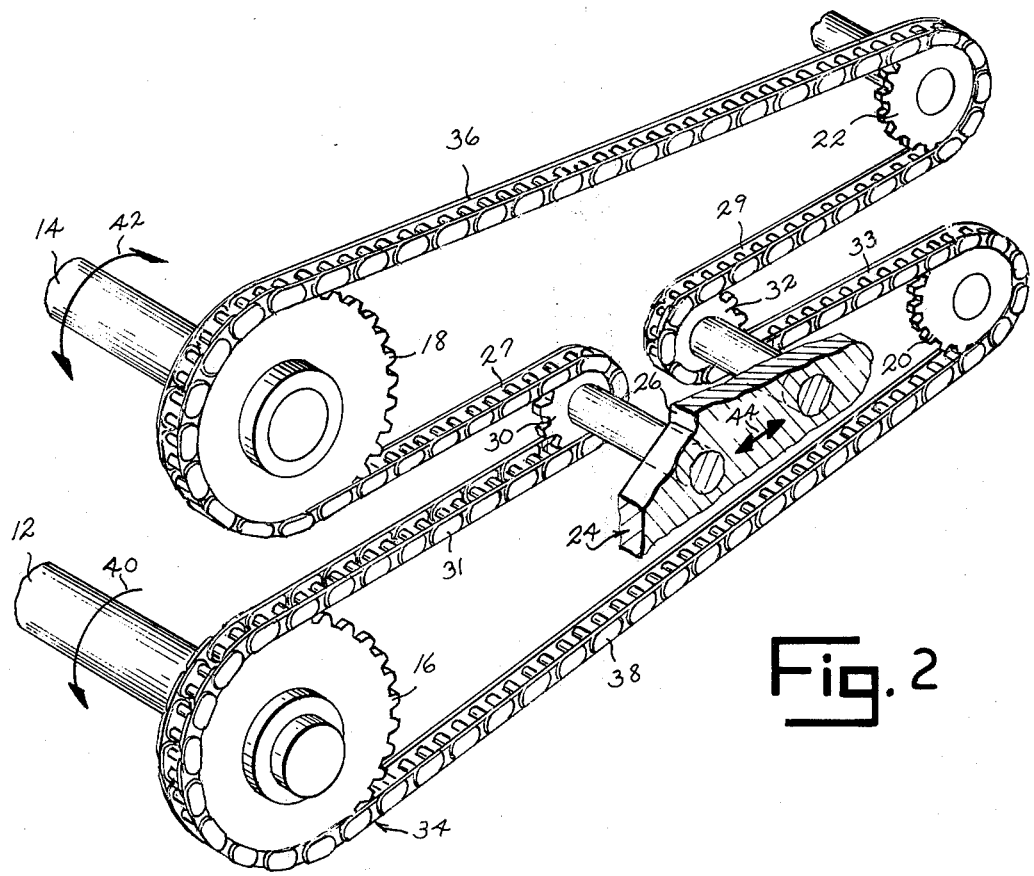

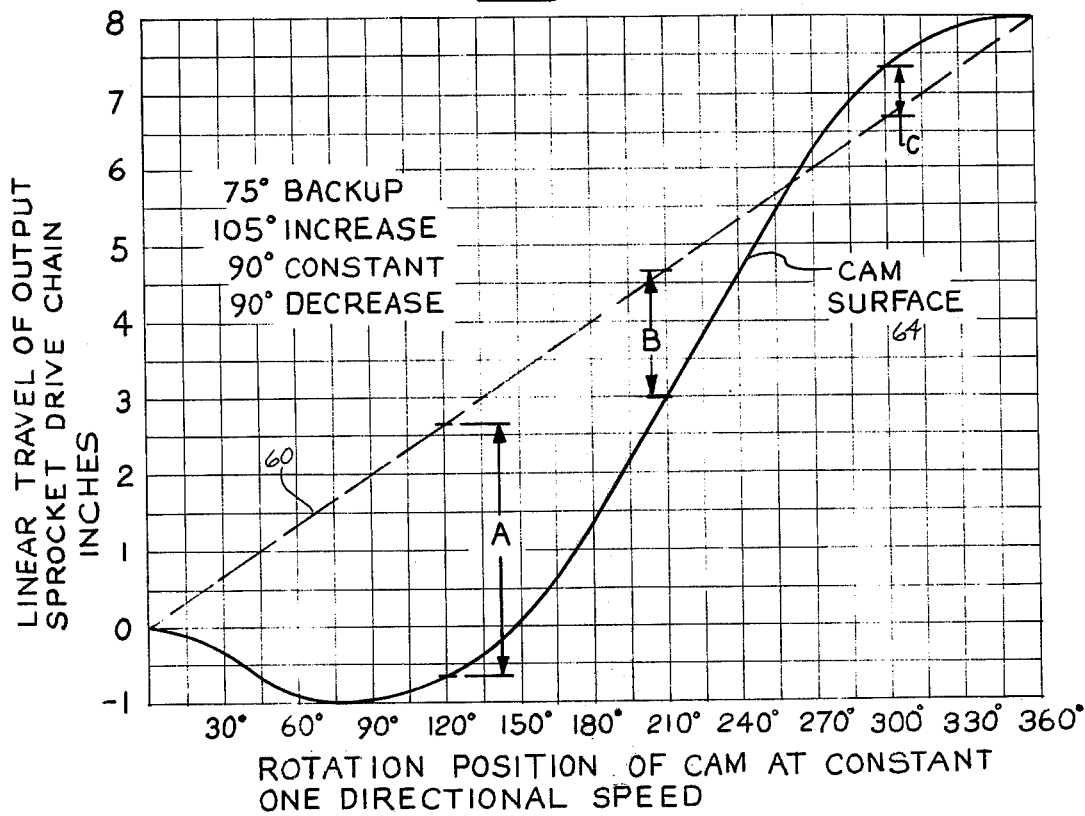
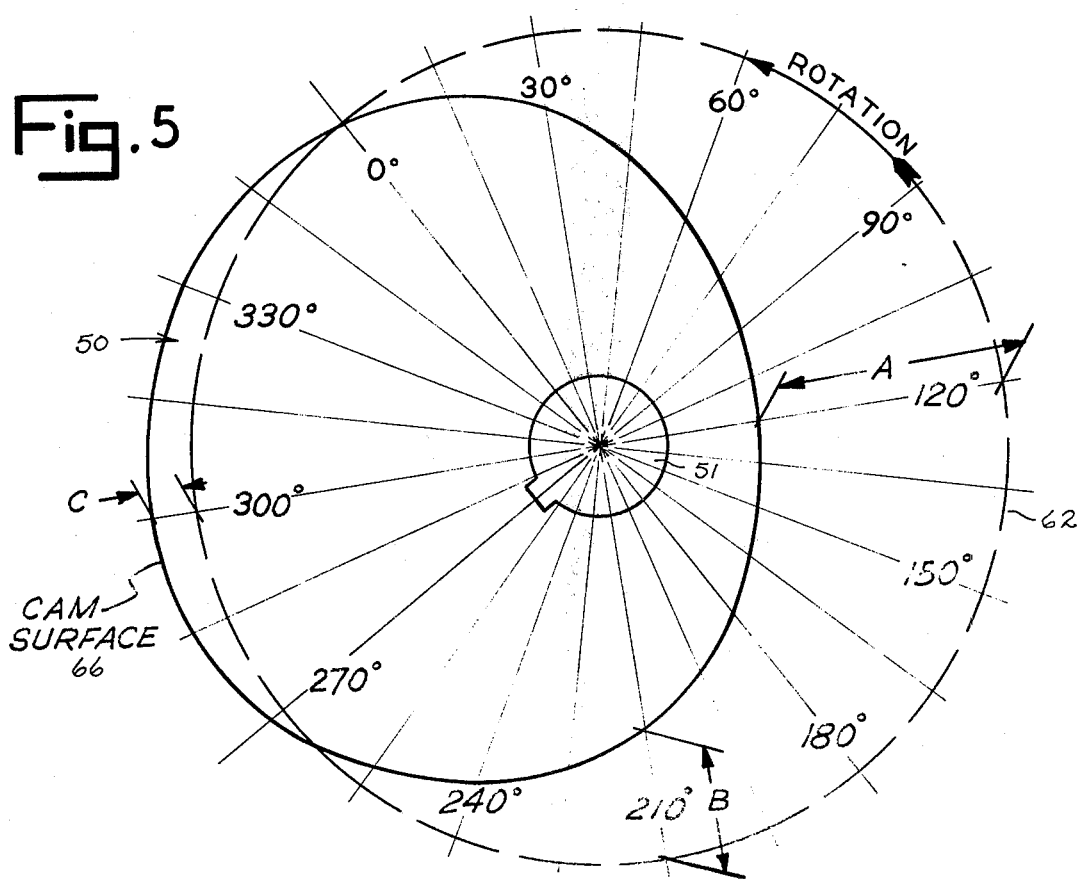

3,906,810

ENDLESS BELT TYPE MOTION TRANSMITTING DEVICE HAVING A VARIABLE SPEED OUTPUT FOR A CONSTANT SPEED INPUT

SUMMARY OF THE INVENTION

This invention relates to a motion transmitting device of the endless belt type in which a variable speed bidirectional rotational output can be effected from a constant one-directional rotational speed input.

In this invention an endless flexible power transmitting member is trained about two spaced pairs of rotational members and a center spaced idler member, all in a power transmitting relationship. Shiftable movement of the idler member between the spaced pairs of rotational members with a constant speed one-directional rotational input being effected through one of the rotational members causes a second rotational member to experience a variable speed output, including bidirectional rotation, with periods of no rotation or dwell.

Accordingly, it is an object of this invention to provide a motion transmitting device in which constant rotational power input is transformed into a variable rotational speed output.

Another object of this invention is to provide a motion transmitting device having an input shaft and an output shaft interconnected by elongated endless flexible drive transmitting member trained about an idler means which upon shiftable movement relative to the input and output shafts can cause the rotational output to be bidirectional as well as intermittent for a constant speed one-directional input.

Still another object of this invention is to provide a positive drive endless belt type power transmitting device having a two-directional variable speed output for a one-directional constant speed input.

Other objects of this invention will become apparent upon a reading of the invention's description.

BRIEF DESCRIPTION OF THE DRAWINGS

FIG. 2 is a perspective view of the motion transmitting device shown in FIG. 1 with portions of the device broken away for purposes of illustration.

FIG. 3 is a perspective view of another embodiment of the motion transmitting device of this invention.

FIG. 4 is a graph from which the actuating cam for the motion transmitting device of FIG. 1 can be constructed.

FIG. 5 is a plan view of the operating cam for the motion transmitting device of FIG. 1 constructed from the graph of FIG. 4.

DESCRIPTION OF THE PREFERRED EMBODIMENTS

Figure 1:
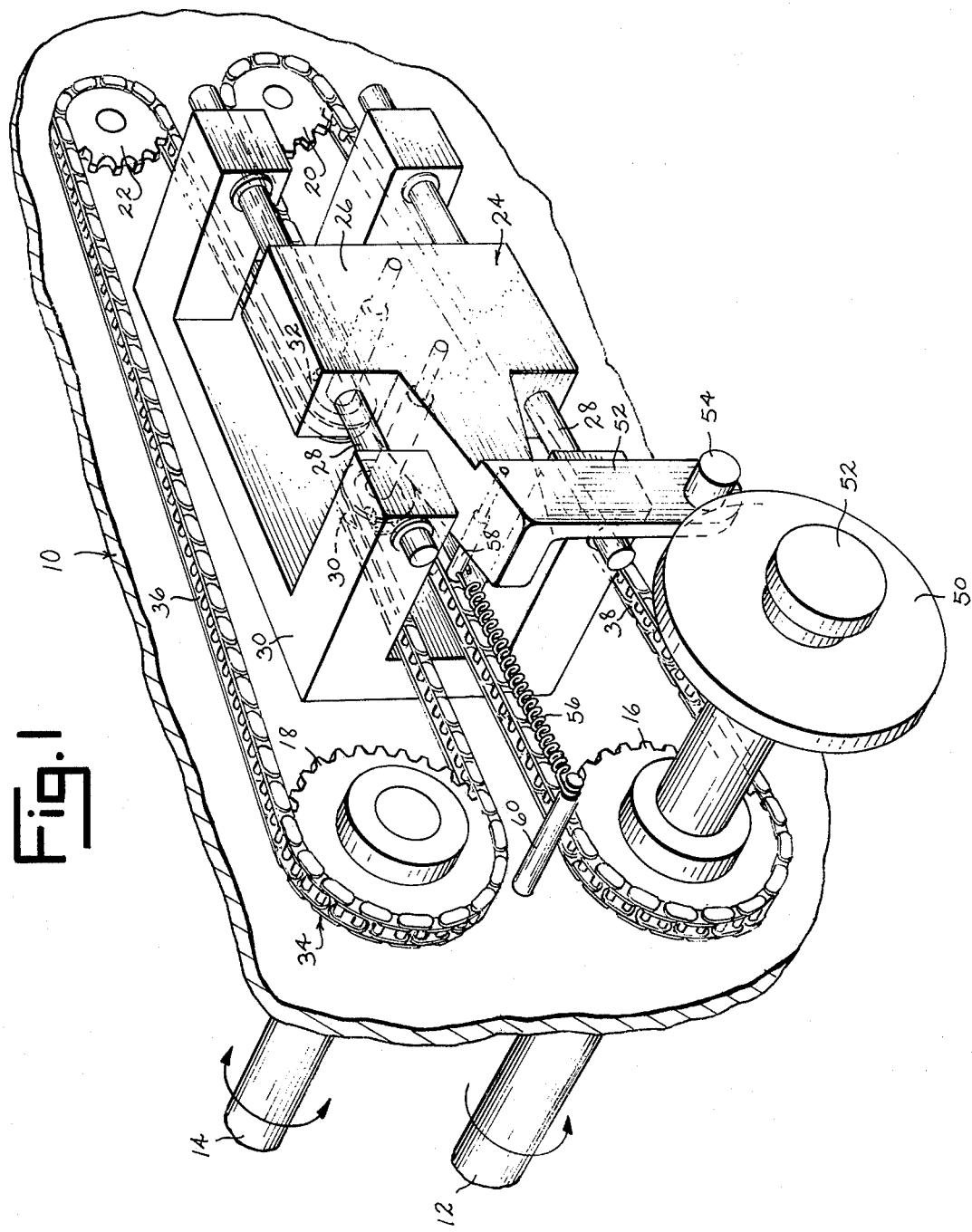
FIG. 1 is a perspective view of one embodiment of the motion transmitting device of this invention.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The embodiment of the motion transmitting device shown in FIGS. 1 and 2 includes a housing member 10 having an input shaft 12 and an output shaft 14 journaled therein. A sprocket 16 is connected to input shaft 12 and a sprocket 18 is connected to output shaft 14. Also journaled within housing 10 are two idler sprockets 20 and 22. Sprockets 16, 18, 20 and 22 preferably lie in substantially the same plane and have parallel axes of rotation with sprockets 16 and 18 being located at one end of housing member 10 and sprockets 20 and 22 being located at the opposite end of the housing member. Additionally, the rotational axes of sprockets 16 and 20 lie in a plane which is spaced from and prallels the plane passing through the axes of rotation of sprockets 18 and 22.

An idler actuating member 24 is located between grouped sprockets 16 and 18 and grouped sprockets 20 and 22. Idler member 24 includes a mounting block 26 which is shiftably supported upon a pair of guide rails 28 for guided straight line reciprocating movement between the grouped pairs of sprockets. Guide rails 28 are carried by a support 30 which forms a fixed part of housing member 10. A pair of sprockets 30 and 32 are carried by mounting block 26. Each sprocket 30 and 32 is connected to a shaft which is journaled for rotation within the mounting block. Sprockets 30 and 32 lie in substantially the same plane as sprockets 16, 18, 20 and 22 and have axes of rotation paralleling the axes of rotation of sprockets 16 and 18. As mounting block 26 shifts between the group of sprockets 16 and 18 and group of sprockets 20 and 22, the axes of rotation of sprockets 30 and 32 follow a flat plane located between the plane passing through the axes of rotation of sprockets 18 and 22 and the plane passing through the axes of rotation of sprockets 16 and 20.

An endless flexible drive chain 34 extends around each of the sprockets 16, 18, 20, 22, 30 and 32. Chain 34 has an upper run 36 which extends from sprocket 22 to sprocket 18. Chain 34 then extends around sprocket 18 to sprocket 30 in a reverse direction, and around sprocket 30 extending to sprocket 16. The chain extends around sprocket 16 and includes a lower run 38 which extends between sprocket 16 and sprocket 20. Chain 34 extends around sprocket 20 and extends to sprocket 32, around sprocket 32 and to and around sprocket 22.

For purposes of describing the operation of the motion transmitting device of FIGS. 1 and 2, it is to be assumed that the operative diameters of sprockets 16 and 18 are the same so that, with idler member 24 remaining at rest and experiencing no shiftable movement, for each revolution of input shaft 12 output shaft 14 will also experience one revolution. The diametrical sizes of the sprockets 30 and 32 are preferably equal with the chain run 27 extending from sprocket 18 to sprocket 30 and the chain run 29 extending from sprocket 22 to sprocket 32 lying in a substantially straight line and the chain run 31 from sprocket 16 to sprocket 30 and the chain run 33 from sprocket 20 to sprocket 32 also lying in a substantially straight line. Chain runs 27 and 31 are preferably parallel to the flat plane in which the axes of rotation of sprockets 30 and 32 follow upon movement of mounting block 26.

The general method of operation of the motion transmitting device above described can be best understood by referring to FIG. 2. With input shaft 12 being rotated at a constant speed in the direction of arrow 40, output shaft 14 will experience bidirectional or two-way rotation as indicated by arrow 42 as well as periods of dwell or no rotational movement, depending upon the direction, distance, and rate of travel of idler member 24, as indicated by arrow 44. Along with the controlled movement of output shaft 14, upper run 36 of chain 34 will experience bidirectional and stopped linear movement upon movement of idler member 24.

As idler member 24 is shifted to the left, as seen in FIG. 2, output shaft 14 and chain run 36 will be caused to either decelerate in speed, dwell, or reverse in direction of movement, depending upon the distance and speed of movement of the idler relative to the speed of rotation of input shaft 12. As the idler member is moved to the right as seen in FIG. 2, the speed of output shaft 14 and chain run 36 will be caused to exceed the speed of input shaft 12. The means for shifting idler member 24 between the groups of sprockets 16, 18, and 20, 22 so as to vary the output of shaft 14 or the linear movement of the upper run 36 of drive chain 34 can vary and may constitute a computer type control, a tape controlled servo control system, a hydraulic control, or a cam control such as that illustrated in FIG. 1.

In FIG. 1, input shaft 12 extends forwardly of sprocket 16. A cam 50 is secured to the projecting end portion of input shaft 12 for rotation with the shaft. Mounting block 26 of idler member 24 carries a leg part 52. A follower pin 54 is secured to leg part 52 and is positioned to contact the peripheral edge of cam 50. Pin 54 may be journaled within leg part 52 to reduce friction between the cam and the pin. Contact between pin 54 and cam 50 is maintained during rotation of input shaft 12 by means of the assistance of a spring 56 which is connected at opposite ends between a pin 58 secured to mounting block 26 of the idler member and a pin 60 connected to housing 10 adjacently above sprocket 16. Spring 56 remains in tension at all times, thereby continually serving to urge pin 54 of idler member 24 against the peripheral edge of cam 50. Rotation of input shaft 12 causes follower pin 54 of idler member 24 to follow the peripheral edge of cam 50 with the idler member and its sprockets 30 and 32 experiencing controlled reciprocating motion along guide rails 28. The design of the peripheral edge of cam 50 determines the direction, rate of travel and distance idler member 24 shifts between sprockets 16 and 18 and sprockets 20 and 22.

In FIGS. 4 and 5 the method of designing a cam 50 is illustrated. In the graph in FIG. 4 the lower horizontal line or abscissa refers to the rotational position of the cam at a constant one-directional speed for one complete revolution of the cam. The vertical line or ordinate on the graph in FIG. 4 is representative of the linear travel of the output sprocket drive chain or upper run 36 of chain 34. The scale of the ordinate of the graph in FIG. 4 is one-half. The broken straight line indicated by the reference numeral 60 is representative of a reference cam having a circular peripheral edge and which upon rotation will impart no movement to idler member 24. With sprockets 16 and 18 each having an effective circumference of eight inches, the linear travel of upper run 36 of the drive chain would be 8 inches upon one complete revolution of input shaft 12 having a circular cam 50 secured thereto. In FIG. 5, circular broken line 62 represents the outer peripheral edge of the circular cam represented by reference line 60 in the graph of FIG. 4. The cam designated by solid line 64 on the graph of FIG. 4 is designed so that upper run 36 of drive chain 34 will back up 1 inch for the first 75° of rotation of the cam and then reverse direction of movement for eight inches of travel, first accelerating in movement for the next 105° or until 180° of cam rotation is reached, then continuing for the next 90° of cam rotation at a constant speed, and lastly decelerating until 360° of cam rotation is reached. Continued rotation of the cam 50 will repeat the first reverse movement, followed by forward movement of accelerating, constant speed and decelerating segments of the upper run 36 of the drive chain and shaft 14.

In constructing the cam 50 shown in FIG. 5, several vertical or ordinate measurements from reference line 60 to the cam surface line 64 of FIG. 4 are obtained and plotted radially, as illustrated by the reference letters A, B and C, relative to the circular reference surface 62 in FIG. 5 throughout its 360° periphery. This results in a peripheral surface 66 being formed for cam 50 which will produce the cyclic motion of upper run 36 of drive chain 34 and rotational movement of output shaft 14 as designed in FIG. 4. The rate of acceleration and deceleration of the drive chain and output shaft movement will vary, depending upon the length of the abscissa relative to the scale of the ordinate used in the graph of FIG. 4. Also, variations in movement of upper run 36 of the drive chain and output shaft 14 can occur, depending upon the particular desired slope and path of the cam surface curve 64 shown in FIG. 4.

To permit the motion transmitting device shown in FIGS. 1 and 2 to accommodate various desired outputs, cam 50 is designed so as to be interchangeable. A knob 50 is screwed upon a threaded reduced neck (not shown) formed on shaft 12 causing cam 52, which is keyed at its center opening 51 to the shaft, to be clamped against a shoulder formed upon the shaft.

In FIG. 3 the motion transmitting device of this invention is shown in modified form. In this embodiment idler member 24' is of a modified construction in that sprockets 30 and 32 are connected for joint rotational movement on a single shaft 66. Shafts 12 and 14 and sprockets 16, 18, 20 and 22 are of similar construction as that described in the embodiment of the motion transmitting device shown in FIGS. 1 and 2. Shaft 66 may be journaled within a rail supported guide block similar in construction to guide block 26 shown in FIG. 1. The operation of the motion transmitting device shown in FIG. 3 is similar to that described for the device shown in FIGS. 1 and 2 in that reciprocating motion of idler member 24', as indicated by arrow 68, between the two spaced groups of sprockets causes the upper run 36 of drive chain 34 and output sprocket 14 to experience bidirectional, accelerating and decelerating rotational movement as well as dwell or stop movement upon a constant speed one-directional rotational movement of input shaft 12, as indicated by arrow 40.

It is to be understood that the guiding means and method of shifting sprockets 30 and 32 in the embodiments shown in this description of the invention can vary. Additionally, other flexible drive means such as a drive belt contacting accommodating pulleys can be used instead of a drive chain and engaging sprockets. Also sprockets 16 and 18 may be of different diameter and input shaft 12 rotated at varying speeds and in reverse directions.

It is to be further understood that the invention is not to be limited to the details above given, but may be modified within the scope of the appended claims.

What I claim is:

1. A motion transmitting device comprising two pairs of spaced first and second rotative members, said first and second rotative members having substantially parallel axes of rotation, the first rotative members of said paris having their axes of rotation lying in a plane extending therebetween, the second rotative members of said pairs having their axes of rotation lying in a plane extending therebetween and being spacedly positioned from the plane extending between the axes of rotation of said first rotative members, idler means positioned between said pairs and said planes and including a third pair of rotative members, said third pair of rotative members having axes of rotation paralleling the axes of rotation of said first and second rotative members, guide means wherein said third pair of rotative members is reciprocally shiftable as unit along a substantially straight line between said planes from adjacent one said first mentioned pairs to adjacent the other of said first mentioned pairs, an endless flexible drive member trained about each of said rotative members in a power transmitting relationship, said drive member extending from the first rotative member of said one pair to the first rotative member of said other pair and there reversing direction and extending to one rotative member of said third pair and again reversing direction and extending to the second rotative member of said other pair and again reversing direction and extending to the second rotative member of said one pair and again reversing direction and extending to the other rotative member of the third pair and there reversing direction and extending to the first rotative member of said one pair, one of said first and second rotative members of said one pair constituting means for receiving a rotational input whereby one of said first and second rotative members of said other pair will experience a variation in speed upon selected movement of said idler means along said guide means, and means for continuously shifting said idler means along said guide means in reciprocative directions and at repetitive variable speeds.

2. The motion transmitting device of claim 1 wherein said rotative members are sprockets and said flexible means is a drive chain engaging said sprockets.

3. A motion transmitting device comprising two pairs of spaced first and second rotative members, said first and second rotative members having substantially parallel axes of rotation, the first rotative members of said pairs having their axes of rotation lying in a plane extending therebetween, the second rotative members of said pairs having their axes of rotation lying in a plane extending therebetween and being spacedly positioned from the plane extending between the axes of rotation of said first rotative members, idler means positioned between said pairs and said planes and including a third pair of rotative members, said third pair of rotative members having axes of rotation paralleling the axes of rotation of said first and second rotative members, guide means wherein said third pair of rotative members is reciprocally shiftable as a unit along a substantially straight line between said planes from adjacent one said first mentioned pairs to adjacent the other of said first mentioned pairs, an endless flexible drive member trained about each of said rotative members in a power transmitting relationship, said drive member extending from the first rotative member of said one pair to the first rotative member of said other pair and there reversing direction and extending to one rotative member of said third pair and again reversing direction and extending to the second rotative member of said other pair and again reversing direction and extending to the second rotative member of said one pair and again reversing direction and extending to the other rotative member of the third pair and there reversing direction and extending to the first rotative member of said one pair, one of said first and second rotative members of said one pair constituting means for receiving a rotational input whereby one of said first and second rotative members of said other pair will experience a variation in speed upon selected movement of said idler means along said guide means, said one rotative member of said one pair which receives said rotative input being mounted upon a shaft, a cam member carried upon said shaft for rotation with said one rotative member, said idler means carrying cam follower means contacting said cam member for imparting shiftable movement of said idler means along said guide means upon rotation of said shaft.

4. A method of obtaining a variable speed two-directional rotational output from a transmission device having a constant one-directional rotative input, said transmission device including four spaced rotative members having parallel axes of rotation, a pair of spaced rotative idler members having axes of rotation paralleling the axis of rotation of said four rotative members, said idler members located between spaced pairs of said four rotative members, an endless flexible drive member passing around and in driving contact with said four rotative members and said idler members, said method comprising the steps of:

a. imparting a constant one-directional rotative input to one rotative member of one of the pairs of four rotative members, and b. shifting said idler members as a unit in a straight line path between said pairs of four rotative members at a selected speed and in reciprocative directions to cause one rotative member of the other of the pairs of said four rotative members to experience a selected directional rotative output at a selected speed.

5. The method of claim 4 and including the continuous repetition of step (b) to cause a selected cyclic directional rotational output at a selected cyclic speed of said one rotative member of the other pair of said four rotative members.

6. The method of claim 5 wherein said idler members are shifted to cause said one rotative member of the other pair of said four rotative members to rotate at variable speeds.

* * * * *